United States Patent
Truscello

(10) Patent No.: US 6,326,041 B1
(45) Date of Patent: Dec. 4, 2001

(54) PROCESS FOR PRODUCING FOOD PRODUCTS

(75) Inventor: Franco Truscello, La Morra (IT)

(73) Assignee: Soremartec S.A. (BE)

( * ) Notice: Subject to any disclaimer, the term of this patent is extended or adjusted under 35 U.S.C. 154(b) by 0 days.

(21) Appl. No.: 09/626,860

(22) Filed: Jul. 27, 2000

(30) Foreign Application Priority Data

Jul. 28, 1999 (EP) .................................................. 99830487

(51) Int. Cl.⁷ ................................. A23G 1/00; A23G 3/00
(52) U.S. Cl. ........................ 426/279; 426/515; 426/660
(58) Field of Search ........................... 426/93, 94, 100, 426/103, 138, 139, 279, 297, 660, 389, 512, 514, 515

(56) References Cited

U.S. PATENT DOCUMENTS

| 2,167,353 | 7/1939 | Frediani | 426/138 |
|---|---|---|---|
| 2,495,403 | 1/1950 | Bernards et al. | 426/100 |
| 3,331,691 | 7/1967 | Lindsey | 426/100 |
| 3,366,077 | 1/1968 | Gardner | 426/94 |
| 4,190,676 | 2/1980 | Göringer et al. | 426/100 |
| 4,787,534 | 11/1988 | Cillario | 222/130 |
| 4,832,180 | 5/1989 | Ferrero | 198/468.3 |
| 4,986,080 | 1/1991 | Grigoli et al. | 426/100 X |
| 5,343,710 | 9/1994 | Cathenaut et al. | 426/100 X |
| 5,931,279 | 8/1999 | Pedrotto et al. | 198/468.3 |

FOREIGN PATENT DOCUMENTS

| 3909317 | 10/1990 | (DE) . |
|---|---|---|
| 19620896 | 11/1997 | (DE) . |
| 19736608 | 8/1998 | (DE) . |
| 0083324 | 4/1988 | (EP) . |
| 0322469 | 7/1989 | (EP) . |
| 0589820 | 3/1994 | (EP) . |
| 0914774 | 5/1999 | (EP) . |
| 0914775 | 5/1999 | (EP) . |
| 2680635 | 3/1993 | (FR) . |
| 983575 | 2/1965 | (GB) . |
| 9532633 | 12/1995 | (WO) . |

*Primary Examiner*—Arthur L. Corbin
(74) *Attorney, Agent, or Firm*—Rothwell, Figg, Ernst & Manbeck, P.C.

(57) ABSTRACT

A process for the manufacture of food products is provided which includes the steps of providing a mold, filling the mold with a quantity of molding material in a fluid state, and inserting a plug made of an edible material, such as wafer, into the mold cavity to define a space to be filled by molding material.

2 Claims, 1 Drawing Sheet

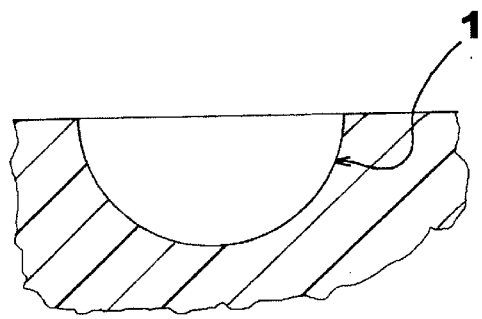
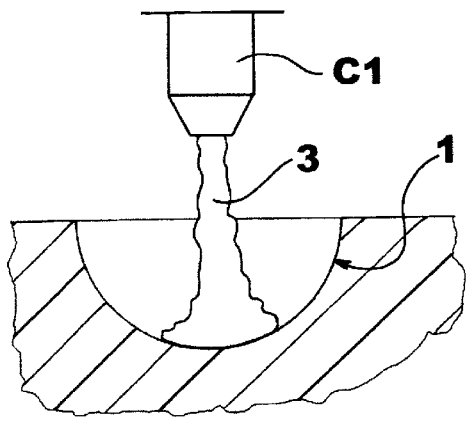
fig1
fig2
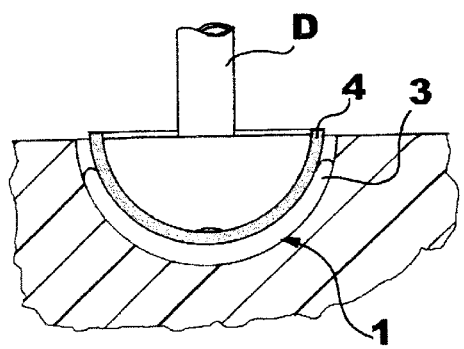
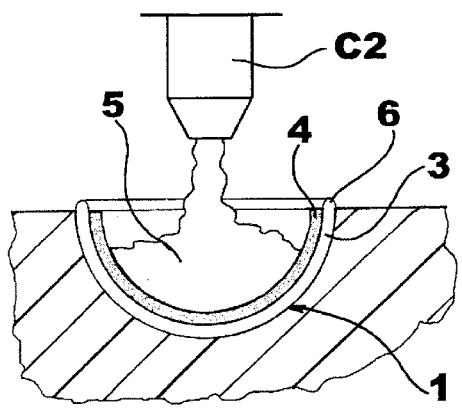
fig3
fig4
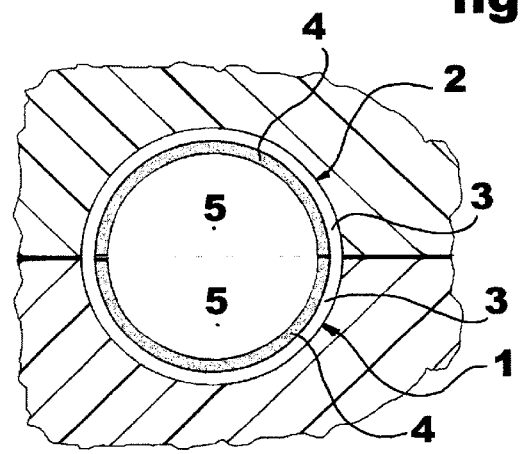
fig5

PROCESS FOR PRODUCING FOOD PRODUCTS

BACKGROUND OF THE INVENTION

1. Field of the Invention

The present invention relates to a process for the manufacture of food products.

2. Description of the Related Art

Such a process is known, for example, from WO-A-95/32633 and BP-A-0 589 820, which describe a process and a system whereby a cooling element with a temperature below 0° C. is immersed in a molten material (such as chocolate) which was previously poured into a mold. The molten material thus solidifies, forming a shell and enabling the cooling element to be extracted from the mold, after serving as a molding plug.

Generally similar arrangements are also known from EP-A-0 914 774 and EP-A-0 914 775.

The shape of the plug enables the chocolate to be evenly distributed inside the mold (forming a shell while still in a fluid state). At the same time, the fact that the plug is cooled enables the chocolate shell to solidify.

In practice, cooling is not normally allowed to continue until the entire mass of the shell solidifies, but only until the portion of chocolate in contact with the plug is solid. The time required for this varies in dependence on the temperature of the plug: usually it takes 4–6 seconds. In other words, the plug is held inside the mold for the time it takes for the portion (or layer) of chocolate in contact with it to solidify, thus enabling it to be detached and extracted.

This technique has various disadvantages, however.

First, the structure of the plug is unavoidably somewhat complex, owing above all to the need to provide the cooling structures, which must be able to follow the movement of the plug.

Secondly, the shape of the plug must complement the internal shape of the product being formed. As a result, the machine must be fitted with a different type of plug when production is changed to a different item.

A further disadvantage is due to the fact that, before extracting the plug and, even more, before being able to do anything to the shell that has just been formed (filling it, for example, or coupling it to a similar shell or the like), it is necessary to wait until the edible material forming the shell is, at least partially, solid. This need to wait for a certain period of time before being able to extract the plug from the mold means that the efficiency of the process is intrinsically low.

The aforesaid disadvantages are particularly significant should the technique be used to manufacture large numbers of items of small dimensions, small hollow chocolate eggs, possibly with a filling, for example.

In this context, it should not be forgotten that the molding material is usually chocolate or a material similar to chocolate, which needs to be cooled in accordance with definite and precise criteria and timing laws, so as to avoid, any anomalous crystallization, for example, which might result in ingredients separating and migrating to the surface.

A further significant disadvantage relates to the possible formation of condensation on the surface of the plug.

Since the plug is cooled to below 0° C., it causes ambient steam to condense onto its surface (forming dew). This problem further delays the removal of the plug and, above all, constitutes a possible, dangerous source of contamination of the product being manufactured: some of the water which accumulates on the plug is in fact deposited on the chocolate shell. For this reason, the structure of the plug is usually housed in a complementary housing maintained at an extremely low relative humidity, thereby further complicating the overall structure of the system in respect of both organization and cost. In any case, this measure does not guarantee that the problem will be eliminated.

SUMMARY OF THE INVENTION

The object of the present invention is to provide a process for the manufacture of food products which is able to overcome the aforesaid disadvantages.

This object is achieved, according to the invention, by providing a process having the features claimed in the subsequent claims which follow.

The process of the invention is based on the recognition of the fact that it is possible to use a (preferably rigid and hollow) body made of edible material as the molding plug and to leave it in the mold, as an integral part of the finished food product, once the molten material has solidified.

This arrangement provides various advantages.

First, the body of edible material which acts as the plug "locks" the melted material in the mold, ensuring the stability of the desired shape and avoiding the need to wait for the material to solidify, even partially. The product formed in the mold can be forwarded directly to the next stage in the process (filling and/or coupling with a similar shell) without any delay.

As to coupling the shell with a similar one, it is possible to measure the quantity of molten material poured into the mold in such a way that the insertion of the edible plug causes a rim of melted material to form around the opening of the mold, which can be used for bonding to a similar rim around another shell. This would work when using conventional frontal coupling techniques used in the manufacture of a variety of food products, such as chocolate eggs, for example.

It is of course clear that a lot of time is saved, thus improving productivity. In addition, it is possible to avoid having to cool the molding material (chocolate, for example, with the characteristic difficulties involved in this process, as recalled earlier) only to have to heat at least a small portion once again so as to bond it to another shell.

Another considerable advantage of the invention consists in the fact that in order to switch production to a differently shaped item, it is sufficient only to adopt plugs of edible material of the different, corresponding shape, without having to refit the machine, and in particular the assembly which moves the said plugs, which is preferably constituted by vacuum-grip members, which is able to work in the same way with edible plugs of different shapes.

The invention will now be described, purely by way of non-limitative example, with reference to the appended drawings.

BRIEF DESCRIPTION OF THE DRAWINGS

FIG. 1 shows a mold cavity in accordance with the preferred embodiment;

FIG. 2 shows the mold cavity of FIG. 1 being filled;

FIG. 3 shows a molding plug being inserted in the mold cavity of FIG. 1;

FIG. 4 shows the molding plug of FIG. 3 being filled; and

FIG. 5 shows the finished product in accordance with the preferred embodiment.

DETAILED DESCRIPTION OF THE PREFERRED EMBODIMENT

As a preamble, it must be said that the appended drawings illustrate the manner of performing the process of the invention with reference to the finished product illustrated in FIG. 5 and the operations carried out on the elements constituting it.

The criteria involved in specific operations (such as for example pouring an edible mass or manipulating edible plugs, etc.) and the criteria for preparing and producing the individual elements illustrated should be taken as known, since they are commonly used in the food industry. As such, the aforesaid criteria are not illustrated in any detail here.

In the appended drawings, the reference numbers 1 and 2 show two molding cavities formed in respective molds (or half-molds, to be more precise), each having one or more cells (in the drawings, only one cell is shown of each mold). The molding cavities 1 and 2 are intended for the manufacture of half shells shaped like half eggs, suitable for joining together (by bringing the two half-molds together so that the two cavities mate frontally) in order to produce items such as filled eggs, for example, with dimensions (axial length) ranging from 1.5 to 2 cm.

The technology involved in the manufacture and handling of such molds is well known, as demonstrated, for example, by the patent EP-A-0 083 324.

It will be appreciated that views 1 to 5 constitute in fact "equatorial" sections of the said molding cavities, that is sections from which it is not possible to appreciate the aforesaid ovoid shape, which is visible in a "meridian" plane. The reference to a molding cavity of a semi-ovoid shape, for manufacturing an egg-shaped end product of a particular size, is obviously only by way of example. The cavity could be of any dimensions and, of course, of any shape: a hemisphere, a pyramid or a mixed shape, just to list a few alternatives, and there is no need for the two mould cavities to be complementary, or for the two corresponding half shells which are to be joined together to be identical, thereby forming a symmetrical product. The molding cavities 1 and 2 can be of different shapes and dimensions.

In addition, the arrangement of the invention is suitable to be used for making shells which are not necessarily intended to be coupled with complementary shells. The shells could be intended to be used alone, possibly with the application of a closure element acting as a lid or plug.

The sequence of FIGS. 1 and 2 illustrates the initial steps in the process of the invention.

A molding cavity 1 is provided, the shape of which matches the external configuration of the item to be manufactured, and therein a predetermined quantity is poured (by means, for example of a pouring machine Cl, which is not illustrated in detail but of a known type, see, for example, U.S. Pat. No. 4,787,534) of a molding material 3 suitable for use as a molding material.

Such a definition is intended to include any food substance able to be poured into a mold in a fluid state (either after having been heated or having a solvent incorporated) and then to solidify (either by cooling or by drying out, for example). We can refer, by way of example, to a quantity of chocolate poured into the molding cavity 1 in a molten state and able to solidify as a result of subsequent cooling. Instructions on determining the quantity of the molding material 3 to be poured into the molding cavity 1 and on the currently preferred method of pouring the material are to be found later in this description.

The reference number 4 indicates a body of edible material intended to act as a molding plug: introduced gradually into the molding cavity 1 which is being filled with the molding material 3, the element 4 causes the molding material 3 to move whereby (see in particular FIG. 3), still in a fluid state, it spreads into the space or gap defined between the inner surface of the molding cavity 1 and the outer surface of the molding plug 4. This occurs in such a way as to form a preferably even layer which, once solid, will form a two-layer shell structure together with the molding plug 4—the outer layer being formed by the molding material 3 and the inner layer by the molding plug 4.

The criteria for selecting the material constituting the molding plug 4 and for choosing the shape thereof are extremely flexible.

With regard to the material, this must be an edible material compatible with the molding material 3, bearing in mind, in particular, the possibility of forming a stable bond. The material must also be rigid enough to be able to act as an effective molding plug. It might also be advantageous for the material to have good heat insulation characteristics, so as to prevent the molding material from cooling too rapidly: this phenomenon could prove a handicap in the event of wanting the molding material 3 to remain in a fluid, or at least malleable state during subsequent manufacturing steps (for example while connecting it to other elements) The preferred choice at the moment is a wafer material.

As to the shape, on the other hand, it is generally advantageous, though not vital, for the outer surface of the molding plug 4 to be complementary with that of the inner surface of the molding cavity 1 so that when the molding plug 4 is inserted into the molding cavity, the space it forms (relative to the inner surface of the cavity), for occupation by the molding material 3, is of a constant or substantially constant thickness. As stated, this is a preference but not an imperative; the aforesaid space could also be of varying thickness in different areas of the mold.

The embodiment illustrated here makes reference to a hollow molding plug 4 constituted, for example, by a wafer cap of approximately the same thickness all over. This choice enables the molding plug 4 to be grasped and inserted into the molding cavity 1 by a pick-up device D operating inside the molding plug 4. The pick-up device could be, for example, a vacuum-gripper D of a type commonly used to handle food products, especially wafer items: see here as a reference the patents U.S. Pat. No. 4,832,180 or EP-A-0 768 254.

In addition, the fact that the molding plug 4 is hollow means that, once it has been released by the pick-up device D and left in the molding cavity 1 holding the molding material 3 in the space between its external surface and the inner surface of the cavity, the same molding plug 4 can be filled with a filling 5. This could be constituted, for example, by an edible liquid, cream-like or paste material injected, for example, by a known pouring machine, illustrated schematically and indicated C2. The filling could be constituted, for example, by a chocolate-flavored cream, with the addition, for example, of whole or chopped dried fruit.

However, in dependence, above all, on the ultimate objective (the desired organoleptic characteristics of the product, for example), the molding plug 4 could be shaped differently. For example, instead of being a hollow shell, or a cap, the molding plug 4 could be constituted by a solid body: it could be, for example, a half—egg shape (with a view to the generally ovoid shape referred to here by way of example)

of meringue or even a piece of fruit such as dried fruit, or a hazelnut, an almond or the like.

The molding plug 4 could also be constituted by a non-homogeneous body, a wafer shell, for example, similar to those shown in the appended drawings, already filled with a cream-like or paste filling and possibly closed around the edge of its opening by a thin wafer layer of a different food material (chocolate, for example).

Whatever the choice, the molding plug 4 is able to fulfil a dual function:

to cause, on insertion into the molding cavity 1, the molding material 3 to be distributed over the surface of the said molding cavity 1, thereby forming a shell, and to "lock" the molding material 3 in the shape thus formed, even if the said material is still in a fluid state, without any need either to cause or wait for the material to solidify, even partially.

It will be appreciated that both the functions described above will still be accomplished—though slightly differently—when the molding plug 4 according to a possible embodiment of the invention is inserted into the molding cavity 1 before the molding material 3, the latter being introduced into the space between the molding plug 4 and the wall of the cavity e.g. through an injection duct (not shown) formed in the body of the mold.

The quantity of molding material 3 entered into the molding cavity 1 is of course determined in dependence on the volume that the molding material 3 is required to occupy. This ensures that a sufficient quantity of the molding material 3 is present in order to fill the entire cavity formed between the inner surface of the molding cavity 1 and the outer surface of the molding plug 4.

The appended drawings, and FIGS. 3 and 4 in particular, refer to an arrangement, which is currently preferred, whereby the quantity of molding material 3 is determined so as to be slightly more than would be strictly necessary to fill the said space. The excess molding material 3 tends to overflow at the top through the annular gap between the mouth of the molding cavity 1 and the molding plug 4, thus forming a rim 6 of molding material in a fluid state.

It will be appreciated that the said rim 6 has a particularly regular and uniform shape owing to the usually viscous character of the molding material 3 (reference can be made again, by way of example, to molten chocolate), which goes together with a correspondingly high level of cohesion, and thus of surface tension.

By means of simple experimental observation of the shape—and dimensions of the molding cavity 1 and the molding plug 4, it is thus possible to identify the precise quantity of molding material 3 required to produce a rim 6 which projects sufficiently from the edge of the shell formed in the molding cavity 1. Attention must be paid, of course, to preventing the molding material of the rim 6 from dripping into the molding plug 4 acting as plug and/or onto the surface of the mold around the cavity in which the product is being formed. It will be appreciated, in this context, that the relative dimensions of the rim 6 are shown in FIG. 4 as such due to the need for clarity.

Under the aforesaid conditions, the assembly of parts illustrated in FIG. 4 (including any filling 5 that is used) can be coupled with another, structurally identical assembly (though possibly made to a different recipe, for example for the molding material 3) formed in the molding cavity 2 in exactly the same way as described with reference to the molding cavity 1.

As schematically illustrated in FIG. 5, the end result is the formation of a food product comprising a two-layer shell (with, for example, an outer layer of chocolate—constituted by the solidified molding material 3—and an inner layer of wafer—which initially constituted the molding plug 4) containing within it a quantity of filling 5, the two parts of the product being held together by the two bonding rims 6 which have fused.

It is clear that it is only at this stage that the outer layer of the product (formed by the molding material 3) needs to solidify, in order to extract the finished product from the assembly of molding cavities 1 and 2. In particular, should cooling be necessary for solidification, as in the case of chocolate, it is only at this point that the product will need to be cooled, according to specific cooling laws of temperature evolution with time (by passing through a crystallization tunnel at 5° C. for 30 minutes, for example), whereas molding material 3 fills the space between the outer surface of the molding plug 4 and the inner surface of the molding cavity 1 with no substantial cooling action being required.

The principles of the invention remaining the same, the embodiments and manufacturing details of the invention can vary widely from those described and illustrated here, without thereby departing from the scope of the present invention, as defined in the appended claims.

What is claimed is:

1. A process for the manufacture of food products, comprising the steps of:

providing a mold defining a mold cavity, said cavity having a surface;

introducing a quantity of molding material in a fluid state into said cavity;

introducing into said mold cavity a plug having an outer surface which defines, with the surface of said cavity, a space to be filled by said molding material; and filling said space with said molding material;

wherein a plug of edible material is used as the plug; and wherein said plug is constituted by wafer or meringue.

2. A process for the manufacture of food products, comprising the steps of:

providing a mold defining a mold cavity, said cavity having a surface;

introducing a quantity of molding material in a fluid state into said cavity;

introducing into said mold cavity a plug having an outer surface which defines, with the surface of said cavity, a space to be filled by said molding material; and filling said space with said molding material;

wherein a plug of edible material is used as the plug; and wherein filling of said space by said molding material takes place in the substantial absence of any cooling action.

* * * * *